J. TESSIER.
FOCUSING LENS MOUNT.
APPLICATION FILED MAY 3, 1920.
1,405,463.
Patented Feb. 7, 1922.
2 SHEETS—SHEET 1.
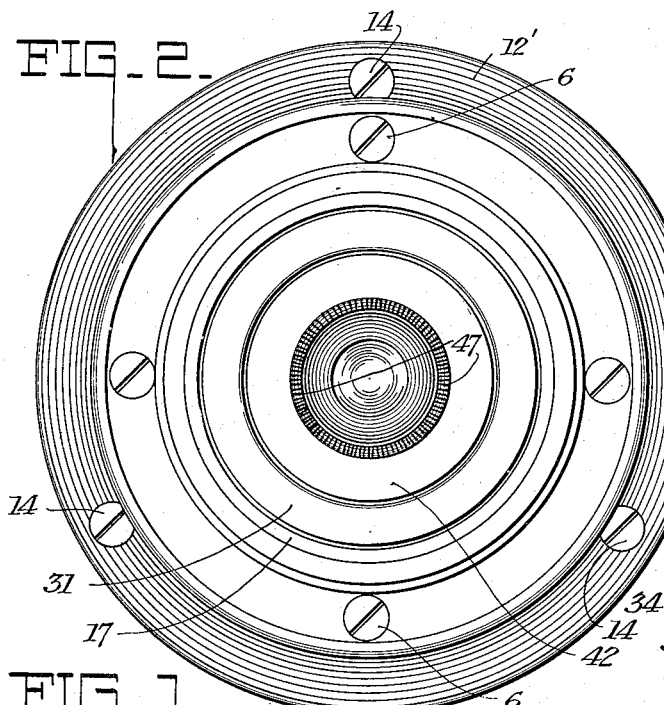
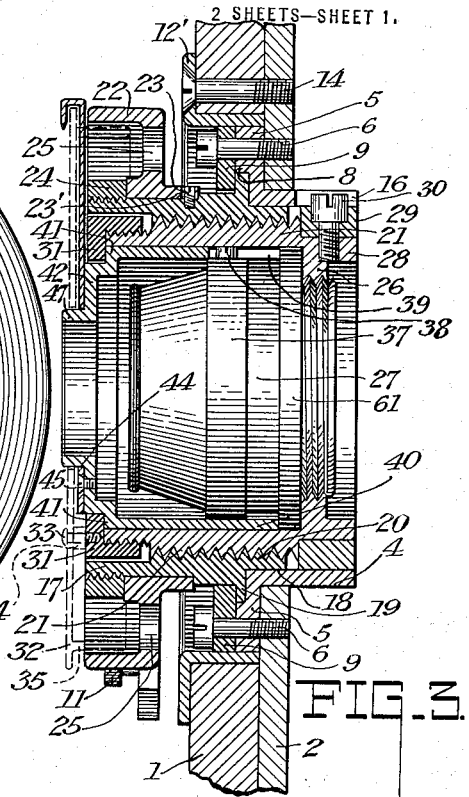
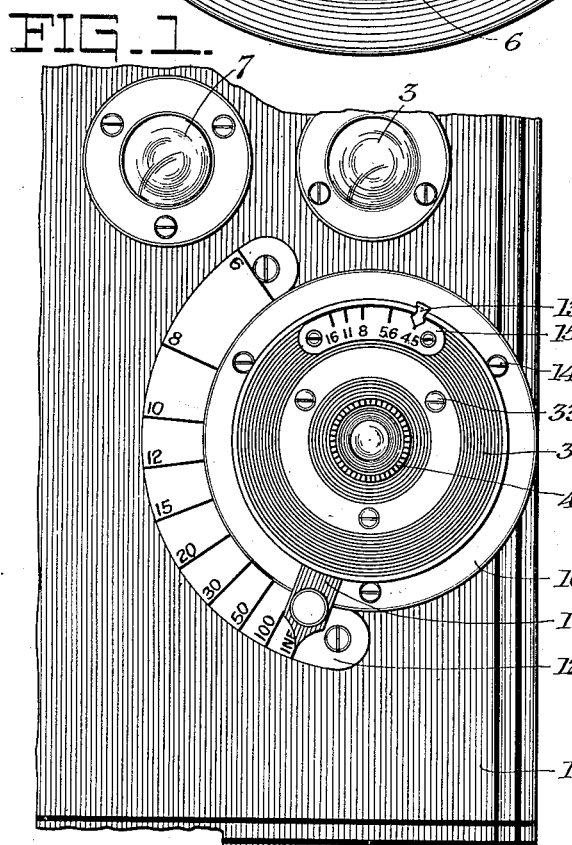
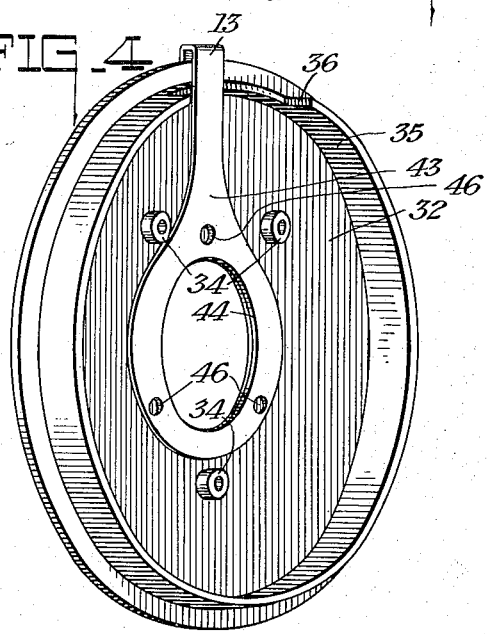
WITNESSES:
INVENTOR
Julien Tessier,
BY
ATTORNEYS.

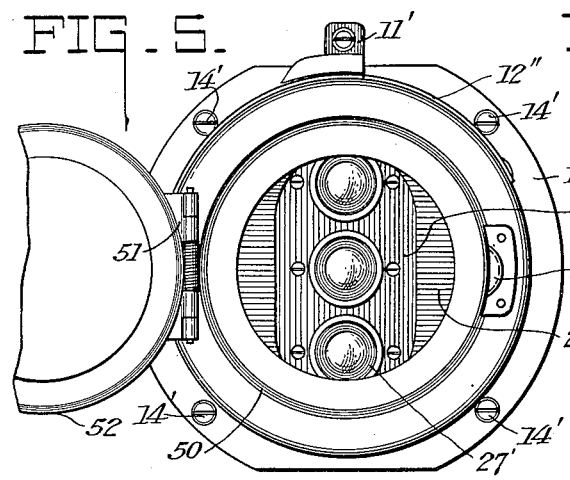
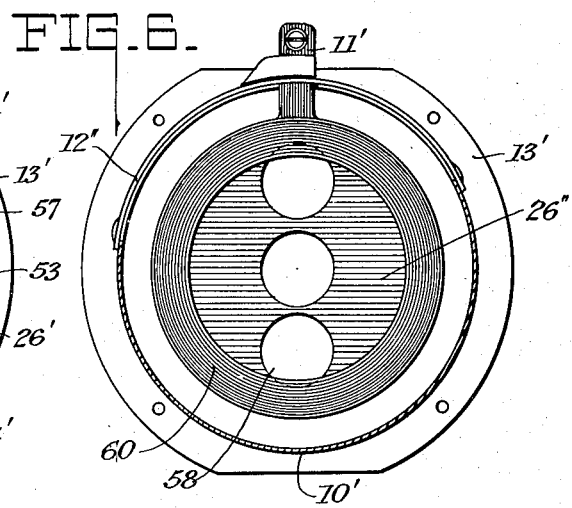
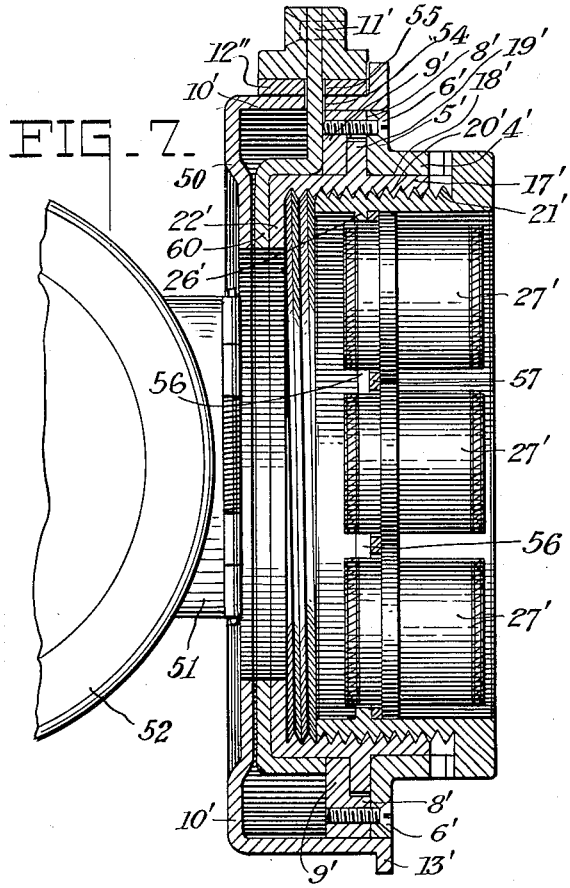
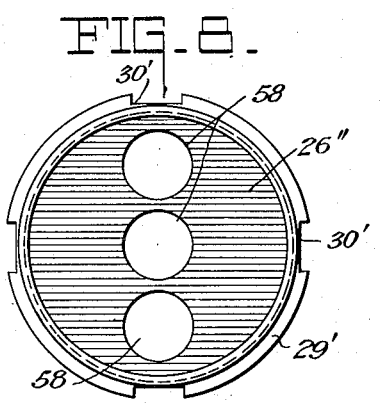
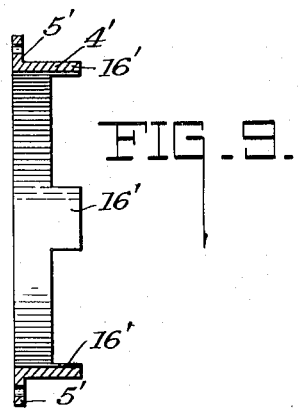

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

FOCUSING LENS MOUNT.

1,405,463.  Specification of Letters Patent.  Patented Feb. 7, 1922.

Application filed May 3, 1920. Serial No. 378,615.

*To all whom it may concern:*

Be it known that I, JULIEN TESSIER, a citizen of France, residing at Rochester, in the county of Monroe and State of New York, have invented certain new and useful Improvements in Focusing Lens Mounts, of which the following is a full, clear, and exact specification.

This invention relates to focusing lens mounts of the type in which the lens or a component thereof is mounted in a cell adapted to be moved relatively to a fixed support or lens board.

The objects of the invention are to provide such a mount that is designed for accurate work, particularly with lenses of short focal length and wherever nicety of adjustment is desirable; which is simple and convenient to manufacture and to use; and which will move the lens in a true axial line without rotation thereof. Other objects will appear in the description of the embodiments hereinafter described.

Reference will now be made to the appended drawings in which:

Fig. 1 is a front elevation of a part of a camera front carrying one embodiment of my invention;

Fig. 2 is a front elevation of the mount with certain elements removed;

Fig. 3 is a diametrical section of the mount;

Fig. 4 is a perspective view of the front plate and diaphragm setting handle;

Fig. 5 is a front elevation of a second embodiment of my invention;

Fig. 6 is a front elevation of a modification thereof with the front plate shown in section;

Fig. 7 is a diametrical section of the form shown in Fig. 5;

Fig. 8 is an elevation of the lens supporting plate in the form shown in Fig. 6;

Fig. 9 is a part of the support showing the guiding means.

The same reference characters refer to the same elements in all of the figures. In Figs. 1 to 4 is shown an embodiment of my invention, designed for and used upon the motion picture camera shown in my application, Serial No. 378,616 filed May 3, 1920. A portion of the camera front 1 is shown having thereon two finders 3 and 7. The focusing mount as a whole is designated 10, and the indicating handle 11 moving on scale 12, is used to focus the lens for the proper distance, while the indicating handle 13 co-operating with scale 15 is used to set the diaphragm.

The front 1 of the camera has a sheet metal backing plate 2. Carried rigidly by this support a tube 4 having a flange 5 is secured to the plate 2 by means of screws 6 passing through the flange 5. The flange 5 has an annular shouldered portion 8, to which is secured, also by the screws 6, an annulus 9 overhanging this shoulder to form a flange. Surrounding the flange and annulus is a collar 12' secured by screws 14 to the camera front. The internal surface of the tube 4 constitutes a smooth bearing surface for a member mounted to turn therein. The tube 4 extends within the camera and has a straight longitudinal slot 16 therein which is used as one of a pair of guiding elements. It is evident that the camera front carrying the parts described constitutes a rigid support having an internal bearing surface, a guiding element, a flange and a scale and this support may obviously be built up from other equivalent structures within the scope of the claims specifying such a support.

Mounted to turn within this support is a tubular member 17 having a smooth external bearing surface 18 turning within the bearing surface of tube 4, and having an outwardly extending flange 19 fitting behind annulus 9 and held by the flanges 9 and 5 against axial movement. This tubular member is internally threaded, as indicated at 20, where it is shown in engagement with the external threads of lens casing 21, which is described hereinafter. The tubular member 17 carries an outwardly extending collar 22, held in place by screw 23 and a collar 24 that screws upon the member 17. This has apertures 25 therein through which the screws 6 may be reached. It also carries the indicating handle 11, mentioned before. Screw 23 engages in slot 23' in collar 22, holding it from rotation, particularly during assembly.

The lens casing 21 has an inwardly extending, internally threaded flange 26 in which lens cell 27 is mounted and supported, and a longitudinally extending portion 28 extending within the camera, and upon this is a collar 29, held in place by screw 30, the head of which engages in slot 16 which thus keeps the lens casing from rotary movement but permits axial movement. Screwed upon the front end of lens casing 21 is a collar 31 to which is secured the front plate 32 of the mount, by means of screws 33, passing through the spacing bosses 34 on the rear surface of 32. Plate 32 has a rearwardly extending flange 35 near its periphery which lies within the collar 22. These elements protect and conceal the parts and assist in making a neat and sightly design for the mount. In flange 35 is a cut-out portion having end walls 36 forming abutments limiting the movement of the diaphragm indicating handle 13. Plate 32 carries on its front surface the scale 15.

Around the lens cell 27 is the band 37 having a screw 38 engaging in slot 39 of the tubular member 40 which is free to rotate in the lens casing. The band 37 controls a diaphragm (not shown) in the cell. Member 40 is held in place by a shoulder 41 thereon engaging behind collar 31, and a further flange 42 extends out flush with collar 31. Indicating handle 13 has a widened extension 43, with a central bearing aperture 44, and is attached to flange 42 by screws 45 extending through apertures 46. A flange 47 carried by flange 42 serves as a bearing lying within aperture 44. The inner end of member 40 engages a collar 61 fixed on lens cell 27 and prevents the same from accidentally unscrewing from the flange 26.

The operation of the parts will be evident from the structure. Movement of the indicating handle 11 turns the rigidly connected structures 22 and 17. Lens casing 21 cannot turn with the tubular member 21 because the screw 39 thereon engages the walls of slot 16 on the fixed support. The screw threaded engagement 20, therefore, forces the movement of lens casing longitudinally axially thereof. Movement of the indicating handle 13 turns the rigidly connected elements 40 and 37 and results in the adjustment of the diaphragm. Since the lens casing does not turn, the scale 15 carried thereby occupies a fixed position, here shown as at the top thereof.

A second embodiment of my invention is shown in Figs. 5 to 9, this structure being designed and used upon the camera designed particularly for color work shown and described in my application, Serial No. 378,611 filed May 3, 1920.

In this embodiment of my invention, the support comprises a tubular member 4' having a flange 5', to which is secured by screws 6' an annular member 9' having the annular shouldered portion 8', and the frame member or collar 10' fitted tightly around the members 4' and 9' so as to be rigid therewith. The collar has an outwardly extending flange 13' adapted to be secured by screws 14' to a suitable lens board or camera front, and carries moreover a scale 12'' on its outer surface adapted to co-operate with the indicating handle 11' to be later described. The collar is bent over the front of the lens mount to form an inward flange 50, to which is secured a hinge 51 for cover 52 and a latch member 53. The member 4' has longitudinally extending guiding lugs 16' on the inner end thereof, and the inner surface thereof constitutes a bearing surface. It is apparent that the elements above described constitute a rigid, fixed support corresponding to that described in the first embodiment and having a scale, a flange, an internal bearing and a longitudinal guide corresponding to those first described.

Mounted within the fixed support is a tubular member 17' having a smooth external bearing surface 18' turning within the bearing surface of 4' and having an outwardly extending flange 19' fitting behind the annular member 9' and held by elements 9' and 5' against axial movement. This tubular member is internally threaded, as indicated at 20', where it is shown in engagement with the external threads of lens casing 21'. The tubular member 17' has an inwardly extending flange 22' at its front end and to this is secured a flanged collar 60 carrying the indicating handle 11' which passes through a slot 54 in collar 10' and 55 in scale 12'.

The lens casing 21' has a web 26' with a large central opening 56, and to the web is secured a plate 57 carrying the three lens cells 27' used in the color camera for which this mount is designed. While I have found it convenient to mount the three cells on a single removable plate, they may be attached independently in apertures 58 of the web 26'' and such a form is shown in Figs. 6 and 8. A portion of the lens casing 21' extends beyond the tubular member 17' and has a flange 29' having cut-out portions 30', which engage the guiding lugs 16' on the support and restrain the lens casing from rotary movement while permitting axial movement thereof.

The operation of this mount is evident. Movement of the indicating handle 11' along the scale 12'' moves the rigidly connected elements 60 and 17', which turn in the support, and since the lens casing 21' cannot turn because of the longitudinal guiding members 16' and 30', it is forced to take an axial movement, the extent of which depends on the pitch of the screw threads at 20'.

It is to be observed that both focusing mounts here described have in common a support as already pointed out, which extends beyond an internal member rotatably supported within it and that a lens casing is carried by this internal member, having a continuous threaded engagement therewith, and having extending portions cooperating with those of the support to guide the casing without rotation. It is important in each construction that such turning should be avoided, and particularly so in the second embodiment. The continuous thread of low pitch makes possible an accurate focusing mount for lenses of short focal length, the pictures taken through which are intended for projection. While the dimensions are not essential, it may be stated that the lenses for which these mounts are designed have focal lengths of about 3 cm. For such use, it is obvious that the mount must be so designed as to be an instrument of precision; while for manufacturing reasons and also because it is intended for use by amateur photographers, it must be simple in structure and easy to assemble, repair and operate.

Having thus described my invention what I claim as new and desire to secure by Letters Patent is:

1. A focusing lens mount comprising a fixed support having a bearing surface, an internally threaded tubular member mounted to rotate upon said bearing surface, and an externally threaded lens casing mounted within said interiorly threaded member, said casing and support having portions extending beyond said member in a longitudinal direction and having cooperating guide portions, whereby the casing is prevented from rotary movement but is free to move axially.

2. A focusing lens mount comprising a fixed support having an internal bearing surface, an internally threaded tubular member having an external bearing surface mounted to rotate within said internal bearing surface, a tubular lens casing having a continuous, externally threaded surface to engage within said internally threaded surface, said support and casing having cooperating guiding means at one end thereof and beyond the end of the tubular member, whereby said casing is restrained from rotary movement but is free to move longitudinally, whereby rotary movement of the tubular member will move said casing axially without rotation.

3. A focusing lens mount comprising a fixed support carrying a scale and having an internal bearing surface, an internally threaded tubular member having an external bearing surface mounted and free to rotate within said bearing surface of said support, said support and member having cooperating flanges preventing relative longitudinal movement, said support extending beyond the member at one end and having in such extended portion a straight longitudinal guide and a tubular lens casing, said casing being externally threaded to fit within the internal threads of the tubular member, and extending beyond said member at one end and carrying on such extended portion a guide member adapted to engage with the guide member on the support, said tubular member having an operating and indicating member adapted to be moved opposite said scale, and by such movement to rotate the tubular member and impart axial movement to the casing without rotation thereof.

Signed at Rochester, New York, this 29th day of April, 1920.

J. TESSIER.